(12) United States Patent
Beckman et al.

(10) Patent No.: US 8,453,114 B2
(45) Date of Patent: May 28, 2013

(54) IMPLICIT ITERATION OF KEYED ARRAY SYMBOL

(75) Inventors: Brian C. Beckman, Newcastle, WA (US); Vijay Mital, Sammamish, WA (US); Darryl E. Rubin, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1189 days.

(21) Appl. No.: 12/344,216

(22) Filed: Dec. 24, 2008

(65) Prior Publication Data

US 2010/0158245 A1 Jun. 24, 2010

(51) Int. Cl.
*G06F 9/44* (2006.01)

(52) U.S. Cl.
USPC .......................................................... 717/116

(58) Field of Classification Search
None
See application file for complete search history.

(56) References Cited

U.S. PATENT DOCUMENTS

| | | | |
|---|---|---|---|
| 5,485,619 A | | 1/1996 | Lai et al. |
| 5,845,126 A | | 12/1998 | Ju et al. |
| 2005/0065910 A1 | * | 3/2005 | Welton et al. ............... 707/2 |
| 2005/0182709 A1 | * | 8/2005 | Belcsak et al. .............. 705/38 |
| 2005/0234876 A1 | | 10/2005 | McHardy |
| 2006/0235874 A1 | * | 10/2006 | Lumley et al. ......... 707/103 R |
| 2007/0078874 A1 | | 4/2007 | Stern et al. |
| 2007/0078881 A1 | * | 4/2007 | Vignet ...................... 707/102 |
| 2007/0174812 A1 | * | 7/2007 | Yang ......................... 717/114 |
| 2007/0277021 A1 | * | 11/2007 | O'Connor et al. ......... 712/208 |

OTHER PUBLICATIONS

"Is Iterating in Lock-Step Possible?" by Roshan James published Mar. 2005. http://www.velocityreviews.com/forums/t820233-is-iterating-in-lock-step-possible.html.*
"Create Multi-Dimensional Array with Custom Index?" by BlllyRayPreachersSon published Jul. 19, 2007.http://www.tek-tips.com/viewthread.cfm?qid=1389972.*
Acklam, Peter. "MATLAB array manipulation tips and tricks" © Aug. 14, 2002. http://www.ee.columbia.edu/~marios/matlab/mtt.pdf.*
A Framework for Numeric Analysis of Array Operations (13 pages) http://www.cs.wisc.edu/wpis/papers/popl05_naao.pdf (Copyright 2005 ACM).
Space Efficient Geometric Data Structures and Algorithms (62 pages) http://photon.poly.edu/~hbr/publi/ilya-thesis/thesis.pdf (Jun. 2006).
Collections and Records (36 pages) http://oracle.cs.uoi.gr/enterprise_server/server.815/a67842/04_colls.htm (Oracle—Copyright 1999—Oracle Corporation).

* cited by examiner

*Primary Examiner* — Wei Zhen
*Assistant Examiner* — Adam R Banes
(74) *Attorney, Agent, or Firm* — Workman Nydegger

(57) ABSTRACT

The use of a data structure that is a symbolic representation of a keyed array that has an array variable and an associated key variable. There is a correlation maintained between the variable type of the array variable and the corresponding keying set that is to be bound to the associated key variable. The keyed array may remain unbound thereby being simply symbolically represented, or the keying set may be bound to the key variable more immediately. In one embodiment, once the keying set is bound to the key variable, data may be bound to the array variable itself. This may be repeated for multiple keyed arrays. The data from multiple keyed arrays may be operated upon to about another array of values, which may then be aggregated in some way.

15 Claims, 3 Drawing Sheets

IMPLICIT ITERATION OF KEYED ARRAY SYMBOL

BACKGROUND

It is a common programming pattern to iterate over data structures to create an array of data structures. The array is often expressed using a single array symbol, whereas individual values of the array are expressed using the array symbol in combination with a unique lookup key. An array that is represented in such a manner will be referred to herein as a "keyed array".

Several examples of keyed arrays will be briefly described. First, an indexed array is a special case of a keyed array, in which the lookup key is an integer. In indexed arrays, the integer lookup key might typically be represented as a subscript of the array symbol. For example, "x" might represent an array of four data structures. The integer lookup keys might be, for example, 0, 1, 2 and 3. The individual values of the array might thus be represented by $x_0$, $x_1$, $x_2$ and $x_3$.

In a more general keyed array, the array values might be from a particular column of a table. The corresponding lookup keys might be from another column of the table, wherein the array symbol in combination with the lookup key from a particular row is bound to the corresponding value of that same row.

Conventionally, computer programming languages permit one or more indexed arrays to be represented within an indexed expression. However, the indices of the array are explicit in that they are defined somewhat separately from the values of the arrays within the indexed expression.

For instance, in one example (hereinafter referred to as "array definition example"), a computer program could declare or define an array of length three, for instance, with the expression "var A=new int[3];". This expression declares A to be an array of integers of length 3, which also declares the index set of A to be integers 0, 1 and 2. To access, or refer to, or express references to the array, the computer programmer would write separate code. For instance, to copy the values of array B to another array A, the computer programmer might write the following code:

```
for (var i=0; i<A. Count( ); i++)
    A[i]=B[i];
```

In this example, the indices are represented in the square brackets in the two indexed arrays A[i] and B[i].

Extending the array definition to another example (called herein the "dot product example"), suppose now that the arrays A[i] and B[i] are to be subjected to a further operation such as the calculation of their dot product. This might be accomplished using the following code:

```
var C=0;
    for (var i=0; i<A. Count( ); i++)
        C+=A[i]*B[i];
```

In the array definition example, an iteration loop was used to assign values to the array A[i]. In the dot product example, another iteration loop was used to perform an operation on the array A[i] (in this example, a dot product with respect to another array B[i]).

Another example of an operation performed on two arrays is the calculation of outer product elements of two arrays (hereinafter, the "outer product element example"). For instance, the following code might be used to calculate the outer product elements D[i, j] of array A[i] and B[i]:

```
for (var i=0; i<A.Count( ); i++)
    for (var j=0;j<B.Count( );j++)
        D[i, j]=A[i]*B[j];
```

Accordingly, in conventional computer program, arrays are iterated over in order to assign values to arrays, and perform operations on those arrays. Furthermore, those iterative loops are expressed in the computer program itself.

BRIEF SUMMARY

Embodiments described herein relate to the use of a data structure that is a symbolic representation of a keyed array that has an array variable and an associated key variable. There is a correlation maintained between the variable type of the array variable and the corresponding keying set that is to be bound to the associated key variable. The keyed array may remain unbound thereby being simply symbolically represented, or the keying set may be bound to the key variable more immediately. In one embodiment, once the keying set is bound to the key variable, data may be bound to the array variable itself. This may be repeated for multiple keyed arrays. The data from multiple keyed arrays may be operated upon to perhaps bind values to yet other arrays of values, which may then be aggregated in some way.

This tool allows for keyed arrays to be more generally represented, and does not require explicit iteration in order to bind values to an array, or operate upon the array. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Embodiments described herein relate to the use of a data structure that is a symbolic representation of a keyed array that has an array variable and an associated key variable. There is a correlation maintained between the variable type of the array variable and the corresponding keying set that is to be bound to the associated key variable. The keyed array may remain unbound thereby being simply symbolically represented, or the keying set may be bound to the key variable more immediately. The bound values of the key variables may then be used to bind data to the keyed array, thereby allow for further processing of the keyed array. Values may be bound to the keyed array, and the keyed array may be operated upon, without an explicit iteration over the array.

First, a general computing system in which the principles described herein may operate will be described with respect to FIG. 1. Then, the principles of the use of a symbolic data structure representation of a keyed array will be described with respect to FIGS. 2 through 6.

Figure 1:
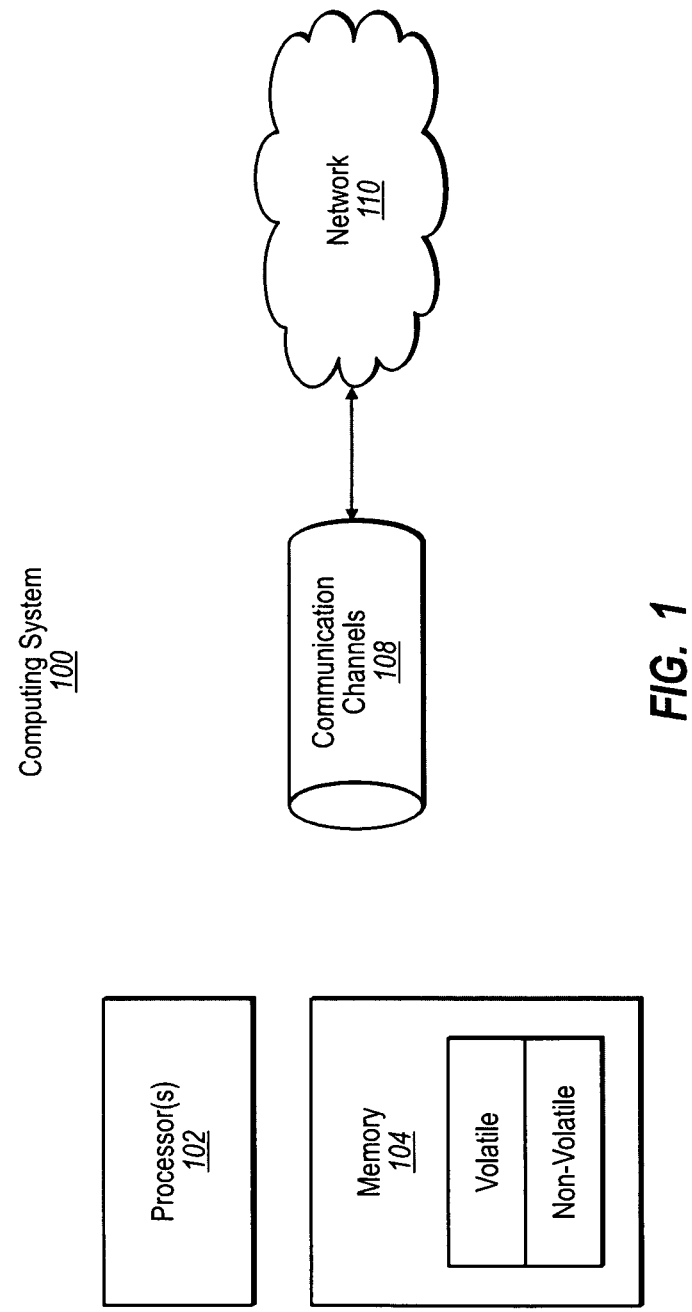
FIG. 1 illustrates a computing system in which the principles described herein may operate.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical tangible storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-readable media might also be embodied in non-physical, intangible media. For instance, when information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
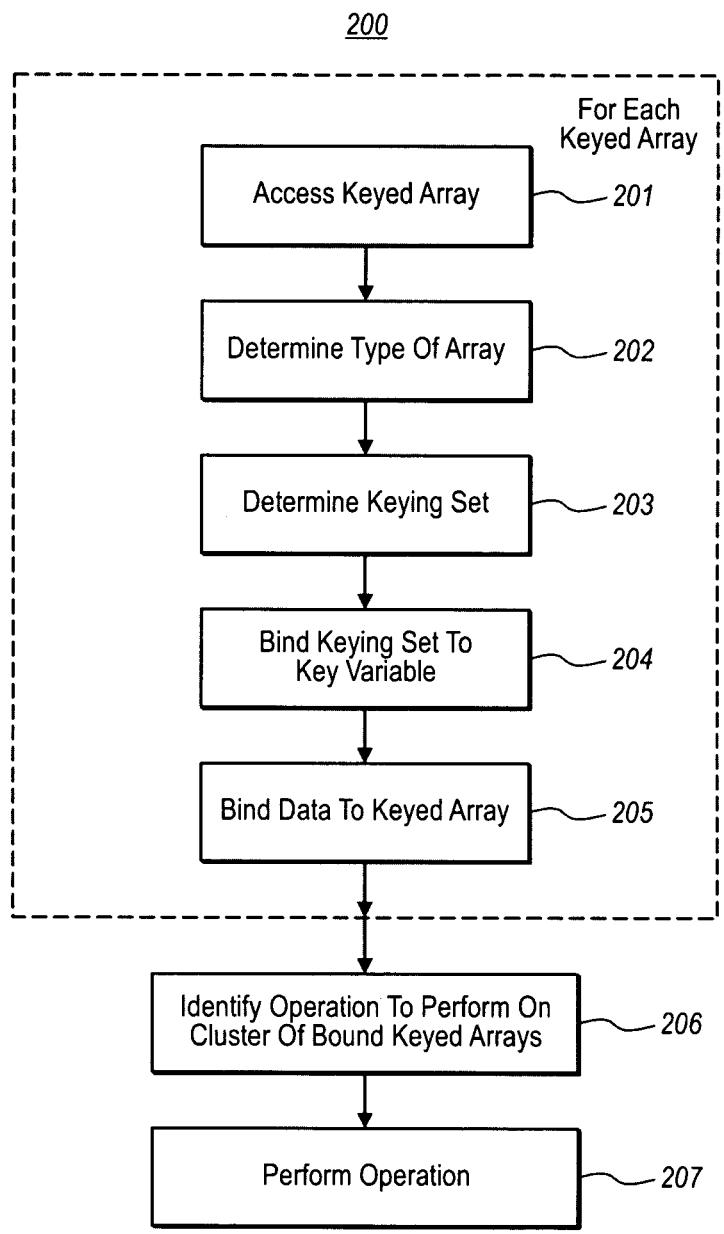
FIG. 2 illustrates a flowchart of a method of binding data to a keyed array.

FIG. 2 illustrates a flowchart of a method 200 of binding data to a keyed array. As with any of the other methods described herein, the method 200 may be performed under the direction of a computer program product that includes one or more computer-readable media having thereon one or more computer-executable instruction(s) that, when executed by one or more processors of a computing system, cause the computing system to perform the method. As an example, the method 200 may be performed by the computing system 100 in response to the processor(s) 102 executing computer executable instructions.

Figure 3:
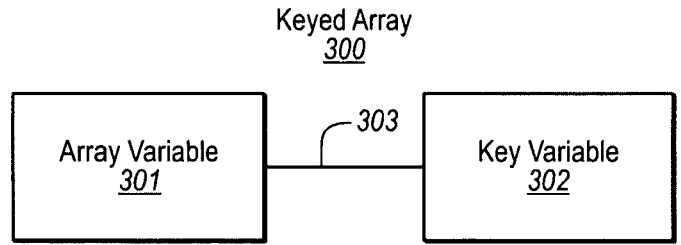
FIG. 3 illustrates related portions of a keyed array including the array variable and an associated key variable.

A portion of the method 200 including acts 201 through 205 may be performed once for each of one or more keyed array. For each keyed array, the method 200 accesses a data structure that is or represents a symbolic expression of a keyed array. FIG. 3 illustrates an abstract representation of a keyed array 300. The keyed array 300 includes an array variable 301 and an associated key variable 302. The association 303 between these two variables is represented abstractly using a line.

As an example, a keyed array might be represented in the following form: $A_B$, where "A" symbolizes the array variable, and where "B" symbolizes the key variable. In this particular case, the association between the array variable "A" and the key variable "B" is represented by the key variable "B" being in a subscripted position with respect to the array variable "A". However, the representation of the association of the key variable with respect to the array variable may be represented in other than subscripted forms as well. In any case, by varying the value of "B" to any of the acceptable values of B, different components of the array "A" might be addressed.

For example, suppose the array variable "A" is a vector having three components. The key variable might be the natural indexing set for that vector. For instance, perhaps the key variable might be the integer set $\{1, 2, 3\}$. Accordingly, the array variable "A" includes three components in the array including $A_1$, $A_2$, and $A_3$. Had the array "A" represented some other variable type, the key variable B might have a different acceptable set. For example, if the array A is a series of values in a particular column of a table (e.g., a revenue column), the key variable might include a keying set that includes values from another column of the table (e.g., a customer ID column). Thus, the key variable might be "Frank", "Sarah", "Mary", "Ernie" and so forth, or perhaps the key variable might be customer numbers 155433, 155444, 155534, 305544 and so forth for other values in the table (e.g., a total revenue for that customer column).

Accordingly, the acceptable natural keying set for a particular keyed array depends on the variable type of the keyed array. Accordingly, returning to FIG. 2, once the data structure representing the keyed array is accessed (act 201), the variable type of the array variable is identified (act 202). The array variable can be of any particular variable type. For instance, the array variable might be an array of simple variable types including integers, floating point numbers, characters, strings, other arrays, and so forth. Alternatively or in addition, the variable type of the array might be more complex including various complex classes. As an example, the keying set might include other keyed arrays. In that case, the method 200 may be recursively performed to bind data to the keyed array that represents the keying set for the higher-level keyed array.

The acceptable keying set may differ depending on a type or class of the array variable or its constituent components. The acceptable keying set might also differ depending on other conditions as well. For instance, suppose it is known that the array variable "A" is a multi-dimensional vector array. If the user is working in the domain of planar math, the natural keying set might simply be $\{1, 2\}$ allowing for $A_1$ and $A_2$ to represent the two-dimensional vector. If the user is working in the array of spatial goemetry, the natural keying set might be $\{1, 2, 3\}$ allowing for $A_1$, $A_2$ and $A_3$ to represent a three-dimensional vector. If the user is working in the domain of string theory, then perhaps the acceptable natural keying set might be any integer from 1 to 26, inclusive, allowing for any value in 26 dimensional space to be represented. The natural keying set might also differ according to where the user is operating, or in accordance with a language used by the user. For instance, perhaps there are some areas of the world that represent a three dimensional vector using three floating point values $A_1$, $A_2$, and $A_3$, while there might be other areas of the world that represents such vectors using symbols $A_0$, $A_1$ and $A_2$, or perhaps $A_X$, $A_Y$ and $A_Z$.

In addition, there might be different ways of associating an array variable with a key variable depending on various contexts. For instance, a three-dimensional vector having a keying set $\{1, 2, 3\}$ might be represented as $A_1$, $A_2$, and $A_3$, or perhaps as A(1), A(2), and A(3), or perhaps as A-1, A-2, and A-3, or perhaps even as $A^1$, $A^2$, and $A^3$, depending on the convention followed under the circumstances.

Figure 4:
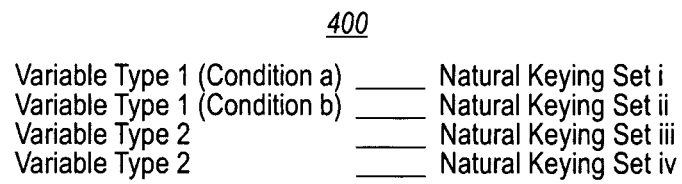
FIG. 4 abstractly illustrates an example correlation between variable types (and optionally also other contextual conditions), and an associated natural keying set.

In any case, based on the variable type of the array variable, and perhaps based on other contextual conditions, the associated keying set is determined (act 203). FIG. 4 abstractly illustrates an example correlation 400 that the computing system itself may use to maintain a correlation between variable types (and optionally also other contextual conditions), and an associated natural keying set. In this specific example, if the array variable is of type I and a particular condition (symbolized a condition "a") applies, then one natural keying set is applied. In FIG. 4, this natural keying set is identified as natural keying set "i", but the concrete values of the natural keying set would be understood by the computing system. If the array variable is of type 1, but another particular condition (i.e., condition "b") applies, then another natural keying set ii is used. If the array variable is of type 2, the yet another natural keying set iii is used. If the array variable is of type 3, the natural keying set iv is used. That said, the computing system may map hundreds or even thousands of correlations between variable types of the array variable and corresponding natural keying set.

Once the associated keying set is determined (act 203), the keying set is then bound to the key variable (act 204) associated with the array variable. For instance, suppose that the keyed array $A_B$ is identified as a three-dimensional array having associated keying set $\{1, 2, 3\}$. In that case, after binding the keying set to the key variable, the keyed array would take on the more specific form as a collection that includes variables $A_1$, $A_2$ and $A_3$.

This principles will now be applied to the array definition example provided above. Recall that in that example, the indexed array was defined as "var A=new int[3];". As a side note, here the relationship between the key variable i and the array variable A is represented with square brackets as in A[i]. Using the principles described herein, the index set now does not need to be expressly defined. Rather, the programmer could instead simply represent the array as "A[i]". The computing system itself could then determine that the array A is of type string, determine that the indexing set $\{0, 1, 2\}$ corresponds to the string array type, and then bind the keying set to the key variable to create the array A[0], A[1] and A[2]. Thus, the complexity in the computer programmer defining an array is greatly reduced.

Now, this binding (i.e., the binding of the keying set to the array variable) may be used to further bind data to the various parts of the array variable itself (act 205). For instance, once the computing system binds the keying set to the key variable, the parts of the array are identifiable, and the computing system may then assign values to the constituent parts of the array. As an example, the variable $A_1$ might be bound to value 5, $A_2$ might be bound to value 3, and $A_3$ might be bound to value 4.

This binding of values to an array may thus be performed without explicitly iterating over the array. For instance, even once the indexing set is bound to the array variable, an explicit iteration was used to bind data to the array. For instance, recall in the array definition example that data was bound to the array A[i] using the following iterated code:

for (var i=0; i<A. Count( ); i++)

A[i]=B[i];

However, using the principles described herein, the computer program might simply write the following:

A[i]=B[i]

If "i" is not otherwise bound to a known variable, the symbol "i" might be interpreted by the computing system to be a key variable. The system might interpret B[i] to also be an indexed array of three string values B[0], B[1] and B[2]. The system itself may then iterate to make the following assignments:

A[0]=B[0]

A[1]=B[1]

A[2]=B[2]

Thus, the computer programmer was able to dispense with expressly iterating over the array A[i] to bind values to A[i].

As previously mentioned, acts 201 through 205 may be performed for multiple keyed arrays to 1) identify the constituent parts of the keyed array by binding the corresponding keying set to the arrayed variable, and 2) binding data to those constituent parts. Thus, multiple keyed arrays having bound data may be made available for further processing. In addition, clusters of two or more keyed arrays may be operated upon. Accordingly, the method 200 optionally determines an operation to be performed between two or more keyed array (act 206), and then potentially also performs the identified operation on the two or more keyed arrays (act 207).

Figure 5:
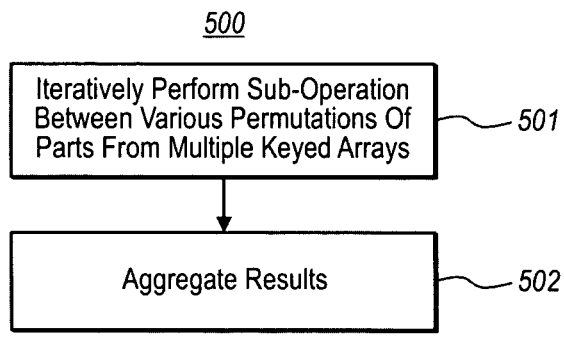
FIG. 5 illustrates a flowchart of a method of a specific example of an operation that might be performed on clusters of multiple bound keyed arrays.

FIG. 5 illustrates a flowchart of a method 500 of a specific example of an operation that might be performed on clusters of multiple bound keyed arrays. A sub-operation is iteratively performed between various permutations of constituent values of the at least two keyed arrays to thereby construct a number of resulting values (act 501). One example of such a sub-operation is a multiply operation, although other types of sub-operations might be performed as well given the context. For example, suppose that there is a data structure than represents the symbolic construction of $A_B \mathrm{x} C_D$, representing that the keyed arrays A and C having respective key variables B and D are to be multiplied together.

There may be different permutations of multiplications performed depending on whether then keying set of B is the same as that of D. For instance, suppose that the keyed arrays are both three-dimensional vectors such that A is the vector $(A_1, A_2, A_3)$, and C is the vector $(C_X, C_Y, C_Z)$. In that case, perhaps the operation is performed lock-step between the two arrays resulting in the three products, $A_1 C_X, A_2 C_Y$ and $A_3 C_Z$. For instance, in the "dot product example" in which the dot product of A[i] and B[i] were calculated, the following simple assignment might be represented in code "C=A[i]*B[i]", rather than having to expressly iterate over the arrays A[i] and B[i].

If the natural keying set had been different, or at least had a different sized keying set, then the result might be the set of Cartesian products between the two arrays. For instance, suppose that the keyed arrays include a two-dimensional vector such that A is the vector $(A_1, A_2)$, and a three dimensional vector C is the vector $(C_X, C_Y, C_Z)$. In that case, perhaps the operation is performed lock-step between the two arrays resulting in the six products, $A_1 C_X, A_2 C_X, A_1 C_Y, A_2 C_Y, A_1 C_Z$, and $A_2 C_Z$. For instance, in the "outer product element example" in which the outer product elements of A[i] and B[i] were calculated, the following simple assignment might be represented in code "D[i, j]=A[i]*B[i], rather than having to expressly iterate over the arrays A[i] and B[i].

Referring back to FIG. 5, these resulting values (e.g., products in the example above) may then be subjected to an aggregation operation (act 502). This aggregation operation may be simply an addition of the various resulting values together (e.g., $A_1 C_X + A_2 C_Y + A_3 C_Z$ or perhaps $A_1 C_X + A_2 C_X + A_1 C_Y + A_2 C_Y + A_1 C_Z + A_2 C_Z$). However, other types of aggregation operations might include finding the minimum value amongst the resulting values, finding the maximum value amounts the resulting values, finding the average or mean amongst the resulting values, finding the standard deviation amongst the resulting values, and so forth.

Figure 6:
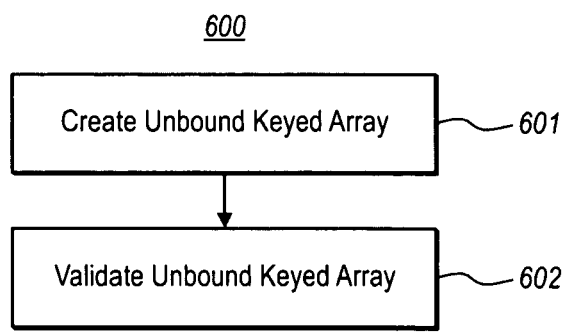
FIG. 6 illustrates a flowchart of a method of validating a computer program that includes a data structure representing a symbolic representation of a keyed array.

The data structure that represents the keyed array may validly exist even if there is no data bound to the keyed array, and even if there is no keying set bound to the key variable. Rather, the data structure may be validated even without being bound to data. FIG. 6 illustrates a flowchart of a method 600 of validating a computer program that includes a data structure representing a symbolic representation of a keyed array. Upon determining that the computer program creates the data structure representing the keyed array (act 601), the computer program is nonetheless validated (act 602) at some level. For instance, if the computer program is being compiled, a compilation error is not generated. If the computer program is being interpreted, and interpretation error is not encountered. If the computer program is running, an exception is not thrown. Thus, the bounding of data to the array variable, and even the binding of data to the key variable may be postponed.

The computer program may later bind data to the keyed array. However, on the other hand, the computer program might not bind data to the keyed array. Rather, the keyed array may be treated as an unbound object, just as any other unbound object.

Accordingly, the principles described herein permit flexibly ways to represent and operate with keyed arrays. Binding of data to keyed arrays may even be deferred without causing validation errors. A computer programmer may represent a keyed array symbolically, and data may be bound to the array without the computer programmer expressly iterating over the array. Furthermore, the array may be operated upon also without the computer programmer expressly iterating over that array.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage media, excluding signals, having stored thereon one or more computer-executable instruction(s) that, when executed by one or more processors of the computing system, cause the computing system to perform a method of binding data to a keyed array, the method comprising:
   an act of accessing a data structure representing a symbolic representation of a keyed array having an array variable and an associated key variable, the symbolic representation including an array symbol representing the array variable and an associated key symbol representing the associated key variable;
   an act of determining a variable type of the array variable;
   based upon the determined variable type of the array variable and based upon a context of the symbolic representation, determining an associated keying set for the variable type of the array, wherein the associated keying set is one of a plurality of keying sets maintained by the computing system; and
   an act of binding the associated keying set to the key variable such that binding values to the array are performed without explicitly iterating over the array.

2. The computer program product in accordance with claim 1, wherein the computer-executable instructions are further structured such that the method further comprising:
   an act of using the binding of the associated keying set to the key variable to bind the keyed array to data.

3. The computer program product in accordance with claim 1, wherein the data structure is a first data structure, the symbolic representation is a first symbolic representation, the keyed array is a first keyed array, the array variable is a first array variable, the associated key variable is a first associated key variable, the array symbol is a first array symbol, the associated key symbol is a first associated key symbol, the associated variable type is a first associated variable type, and the associated keying set is a first associated keying set, wherein the computer-executable instructions are further structured such that the method further comprising:
   an act of accessing a second data structure representing a second symbolic representation of a second keyed array having a second array variable and a second associated key variable, the second symbolic representation including a second array symbol representing the second array variable and a second associated key symbol representing the second associated key variable;
an act of determining a second variable type of the second array variable;
an act of determining a second associated keying set for the second variable type of the second array variable; and
an act of binding the second associated keying set to the second key variable.

4. The computer program product in accordance with claim 3, wherein the computer-executable instructions are further structured such that the method further comprises:
an act of using the binding of the first associated keying set to the first key variable to bind the first array to data; and
an act of using the binding of the second associated keying set to the second key variable to bind the second array to data.

5. The computer program product in accordance with claim 4, wherein the computer-executable instructions are further structured such that the method further comprises:
an act of determining an operation to be performed between the first keyed array and the second keyed array; and
an act of performing the operation between the first keyed array and the second keyed array.

6. The computer program product in accordance with claim 5, wherein the computer-executable instructions are further structured such that the act of performing the operation between the first keyed array and the second keyed array comprises:
an act of iteratively performing a sub-operation between various permutations of constituent values of the first keyed array and constituent values of the second keyed array to thereby construct a plurality of values; and
an act of performing an aggregated operation on the plurality of values.

7. The computer program product in accordance with claim 6, wherein the first variable type of the first key variable is the same as the second variable type of the second key variable.

8. The computer program product in accordance with claim 7, wherein the act of iteratively performing a sub-operation is performed lock-step.

9. The computer program product in accordance with claim 6, wherein the first variable type of the first key variable is different than the second variable type of the second key variable.

10. The computer program product in accordance with claim 9, wherein the act of iteratively performing a sub-operation is performed as a Cartesian product.

11. The computer program product in accordance with claim 1, wherein the associated keying set comprises a plurality of integer values.

12. The computer program product in accordance with claim 1, wherein the associated keying set comprises values from a table.

13. The computer program product in accordance with claim 1, wherein the associated keying set comprises another keyed array.

14. A computing system comprising:
one or more processors;
one or more physical computer-readable media having thereon one or more computer-executable instruction(s) that, when executed by the one or more processors of the computing system, cause the computing system to perform the following:
an act of maintaining a correlation between a plurality of variable types and a plurality of associated keying sets;
in response to accessing a data structure that represents a symbolic representation of a keyed array having an array variable of a variable type and an associated key variable, an act of using the correlation to identify that an associated keying set of the plurality of associated keying sets is associated with the variable type of the array variable; and
an act of, based on the variable type of the array variable, binding the associated key variable to the associated keying set such that binding values to the array are performed without explicitly iterating over the array.

15. A computing system in accordance with claim 14, wherein the computer-executable instructions are further structured such that, when executed by the one or more processors, the computer-executable instructions cause the computing system to further perform:
an act of using the binding of the associated keying set to the key variable to bind the array to data.

* * * * *

UNITED STATES PATENT AND TRADEMARK OFFICE
CERTIFICATE OF CORRECTION

| | | Page 1 of 1 |
|---|---|---|
| PATENT NO. | : 8,453,114 B2 | |
| APPLICATION NO. | : 12/344216 | |
| DATED | : May 28, 2013 | |
| INVENTOR(S) | : Beckman et al. | |

It is certified that error appears in the above-identified patent and that said Letters Patent is hereby corrected as shown below:

In the Drawings

In Drawing, Sheet 3 of 3, Fig. 4, Reference Numeral 400, line 4, delete "2" and insert -- 3 --, therefor.

In the Specification

In column 5, line 60, delete "type I" and insert -- type 1 --, therefor.

In column 7, line 21, delete "$A_1C_x$," and insert -- $A_1C_X$, --, therefor.

In the Claims

In column 10, line 31, in Claim 14, before "based" delete "an act of,".

Signed and Sealed this
Tenth Day of February, 2015

Michelle K. Lee
*Deputy Director of the United States Patent and Trademark Office*